United States Patent [19]

Hagin

[11] 4,071,120

[45] Jan. 31, 1978

[54] SLACK ADJUSTER FOR CAM BRAKES

[76] Inventor: Faust Hagin, Fortnerstrade 35/I, 8000 Munich 45, Germany

[21] Appl. No.: 609,890

[22] Filed: Sept. 5, 1975

[30] Foreign Application Priority Data

Sept. 7, 1974 Germany .............................. 2443004

[51] Int. Cl.² ............................................ F16D 65/52
[52] U.S. Cl. .......................... 188/79.5 K; 188/196 BA; 188/196 P; 188/196 V
[58] Field of Search .................... 188/196 BA, 79.5 K, 188/196 D, 196 P, 196 B, 196 V, 71.8, 71.9, 79.5 GE, 329, 332; 192/111 A

[56] References Cited

U.S. PATENT DOCUMENTS

| | | | |
|---|---|---|---|
| 2,752,009 | 6/1956 | MacDougall | 188/196 BA |
| 3,351,163 | 11/1967 | Sander et al. | 188/196 BA |
| 3,507,369 | 4/1970 | Oliver | 188/196 BA |
| 3,653,470 | 4/1972 | Travis | 188/71.9 |
| 3,921,765 | 11/1975 | Swander, Jr. | 188/79.5 K |

Primary Examiner—Trygve M. Blix
Assistant Examiner—Douglas C. Butler
Attorney, Agent, or Firm—W. G. Fasse; W. W. Roberts

[57] ABSTRACT

A cam actuated brake adjuster reduces automatically the clearance between the brake lining and the brake drum which exists when the brakes are released, if this clearance exceeds a predetermined value. A one-way drive mechanism which adjusts the angular position of a camshaft with the aid of a worm gear is actuated by an adjusting rod assembly, which yields to a given adjusting force corresponding to a given brake force, to prevent an excessive adjustment which might result from a drum distortion caused by the application of a great braking force.

18 Claims, 5 Drawing Figures

SLACK ADJUSTER FOR CAM BRAKES

BACKGROUND OF THE INVENTION

The invention is concerned with an apparatus for adjusting of cam actuated brakes through a worm gear, which is arranged in a casing defined by an actuating lever, and adjusts the camshaft of brakes from an initial position to accommodate wear of the brake linings.

Known automatic adjusters contain a worm gearing and a one-way drive mechanism which together with a linkage converts over a predetermined running clearance the angular rotation of a lever which occurs when the normal clearance between the brake drum and lining increases beyond a preset limit into a rotary motion of the wormshaft, to restore the original clearance. Until now the most commonly used one-way drive mechanisms include on helically wound coil springs either located in two consecutive sleeves as described in the U.S. Pat. No. 3,351,163, or in wrapped relationship to two interior cylindrical consecutive shafts, as described in the U.S. Pat. No. 3,507,369. In both systems, in one rotational direction the spring sticks against the above mentioned adjacent cylindrical pieces and ensures the transmission of an adjusting torque to the wormshaft, and in the other rotational direction the spring releases partially the frictional engagement and allows a relative over-running movement between the two adjacent cylindrical pieces.

In order to avoid an excessive adjustment of the brake shoe relative to the brake drum which may occur with the application of great braking force both systems limit the adjusting force either by declutching the wormshaft as in the U.S. Pat. No. 3,351,163, or by allowing slippage as in the U.S. Pat. No. 3,507,369.

The limitations of the system described in the U.S. Pat. No. 3,351,163 are reduced dependability due to the small section of the coil spring of the clutch mechanism, and therefore an expensive construction to reduce internal friction.

The limitation of the system described in the U.S. Pat. No. 3,507,369 is the difficulty in establishing the torque value at which the coil spring will allow slippage.

An other limitation common to both mechanisms consists in that the frictional contact at the beginning of the clutching does not occur precisely because of the scattering of frictional contact.

OBJECTS OF THE INVENTION

In view of the foregoing, it is the aim of the invention to achieve the following objects singly or in combination: to produce a type of mechanism, which is particularly simple and dependable in its construction and consists of a minimum number of parts and is relatively inexpensive, to achieve substantially continuous rather than stepped adjustment movements, to attain an adjustment corresponding to the actual brake lining wear; to provide means to interrupt the adjusting operation when great brake forces are applied to avoid an excessive adjustment of the position of the brake shoe relative to the brake drum which could result from distortion of the drum; to embody a unit requiring minimal maintenance and is one which is easily installed with a minimum of skill.

SUMMARY OF THE INVENTION

In order to meet these and other objects of the invention there is provided an apparatus for adjusting clearance between a brake shoe and an associated brake drum of a cam actuated brake comprising brake actuating lever means, a worm wheel rotatably supported in said lever means and connected to brake actuating cam means, a shaft carried in said lever means, worm means mounted on said shaft to be slidable axially therealong and rotatable therewith, said worm means being in driving engagement with said worm wheel, rotation of said worm means effecting an angular adjustment of said worm wheel relative to said lever means, ramp means fixedly associated with said shaft, a first clutch element including ramp means cooperating with said ramp means of said shaft, a second clutch element rotatably mounted on said lever means, said clutch elements including mating, force transmitting surfaces, said ramp means cooperating to bring such surfaces into force transmitting engagement, adjustment means secured to said second clutch element and transmitting adjusting movement thereto when said clearance exceeds a predetermined limit. The ramp means are effective to disengage said force transmitting surfaces upon the completion of an adjustment.

The adjustment means most desirably comprises a push rod including resiliently yieldable means through which the adjusting movement is transmitted to the second clutch element, those resiliently yieldable means being effective to prevent an excessive adjustment of the clearance between the brake shoe and the brake drum upon the application of an adjusting force greater than a predetermined magnitude, that is to say, upon the application of a great braking force which might result in distortion of the brake drum.

In one embodiment of this invention, the clutch elements comprise a sleeve and a bushing having matching conical surfaces and the sleeve is connected to the shaft by a helical screw thread configuration, the screw thread configuration constituting the aforementioned ramp means.

In an alternative embodiment the sleeve and shaft are provided with confronting teeth-like configurations including oblique flanks and the oblique flanks constitute the ramp means, cooperation between those flanks being the clutch elements into force transmitting engagements.

An inventive principle of this mechanism consists in that in one direction of rotation, namely the adjustment direction, the clutch elements can readily transmit a relatively high torque, whereas in the other direction, the interaction of said ramp, means both parts are pulled apart, and consequently permit a relative rotation between the clutch elements and, since the adjustment rod means includes a resiliently yieldable component which gives way to a certain adjusting force, overadjustment during drum distortion is avoided.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
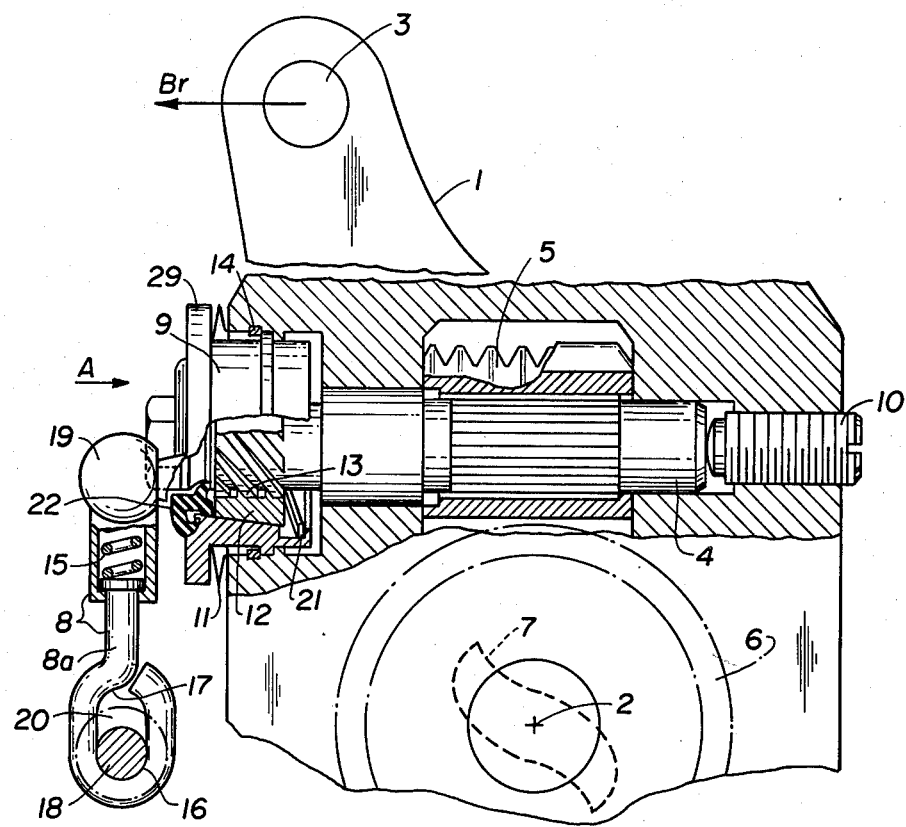
FIG. 1 is a part sectional, part elevational view of an embodiment of this invention.

The construction and function of the individual types of mechanism pertaining to the invention are explained by means of the FIGS. 1 to 5. For the sake of convenience and understanding some similar parts in different illustrations are denoted by the same reference symbol. In the basic type of mechanism pertaining to the invention shown in FIG. 1 is a brake or camshaft actuating lever 1. This lever 1, whose lower part shown in section defines a housing for the location of worm gearing and the adjusting mechanism, is rotatable about an axis 2 located perpendicularly to the drawing plane and is linked to a clevis 32 of a piston rod 30 of a brake cylinder 31 by means of a clevis pin 3 passing through the bores of the said lever and clevis.

A wormshaft 4 is disposed in the lever 1 and a worm 5 is keyed to that shaft by means of splines. The worm 5 meshes with a worm wheel 6 shown in chain dotted line, which likewise revolves about the axis of rotation 2, and is nonrotatably connected with the brake camshaft, of which only a brake cam 7 is shown in chain dotted line in FIG. 1.

Figure 2:
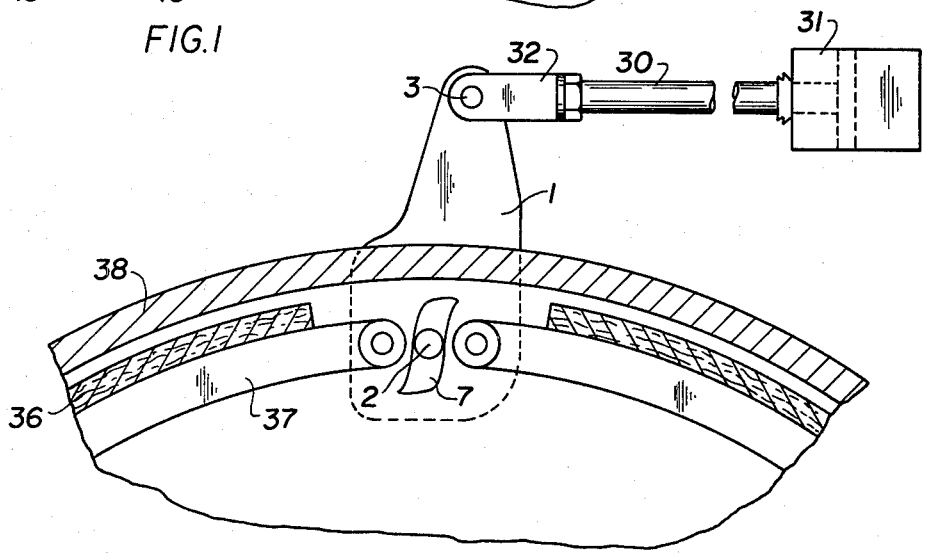
FIG. 2 is a part elevational part sectional view of the embodiment of FIG. 1 but drawn to a smaller scale than FIG. 1.

As will be appreciated from a consideration of FIG. 2 as the actuating lever 1 rotates about the axis 2, brake cam 7 will operate brake shoes 37, to bring them into engagement with brake drum 38. The brake shoes 37 carry frictional linings 36.

A bushing 9, coaxial to wormshaft 4, is rotatably located in the lever 1 by means of a spring ring 14 or of a bayonet locking, not shown. Between the bushing 9 and the lever 1 is provided a face sealing ring 11. An adjusting rod or lever assembly 8 has one end eccentrically connected by a swivel joint 19 to a flange 29 of its bushing 9, whereas the other end, defined by an elongated hole 20, is connected to a stationary dog 18. A lower edge of the hole 20 in FIG. 1 is denoted by 16, whereas an upper edge of the hole 20 is denoted by 17. The bushing 9 defines an internal taper within which is received a corresponding externally tapered portion of a sleeve 12. The sleeve 12 forms the second nonself-wedging element of a pair of threaded elements with a threading 13, the other of those elements being constructed by the wormshaft 4 the threads constituting ramp means. Through an axially acting annular spring 21, the bushing 9 and the sleeve 12 are relatively lightly engaged.

The axial position of the wormshaft 4 is determined by an adjusting screw 10 which supports the axial force of the wormshaft 4 during the brake adjustment.

To conclude, the sealing of the mechanism is completed by an annular sealing element 22, the outer periphery of which is secured to a collar of the bushing 9, while the inner periphery is supported on the wormshaft 4. The mechanism operates as follows: say that, due to a wear, a predetermined normal clearance between the frictional linings 36 and the brake drum 38 is exceeded, then, during a braking operation an extended angular rotation of lever 1 in the direction of the Arrow Br will occur and the upper edge 17 of hole 20 of the adjusting rod assembly 8 will strike the stationary dog 18, whereby the bushing 9 turns in a counterclockwise direction as viewed in the direction of the arrow A. Due to the action of the annular spring 21 the bushing 9 takes along the sleeve 12 during its rotational movement in a counterclockwise direction; simultaneously an axial component of the wedging force generated in the threading 13 is exerted on the sleeve 12; consequently the taper of the sleeve 12 is pressed against the taper of the bushing 9, thus forming a firm force transmitting connection between the sleeve 12 and the bushing 9. As the sleeve 12 continues to turn together with the wormshaft 4 and the worm 5, the meshing worm wheel 6 and the camshaft with the cam 7 will also turn counterclockwise, thereby decreasing the distance between the brake shoes 37 and the brake drum 38 and effecting an adjustment of the brake clearance.

The adjusting rod assembly 8 has a telescopic part 8a with a coil spring 15 contained within to constitute resiliently yielding, force transmitting means connecting the two parts of the rod assembly. A high brake actuating force results in a high frictional moment on the worm 5 and a further movement of the lever 1 in the direction of the Arrow Br results in shortening the effective length of the adjusting rod assembly 8, so that the movement initiated in the adjusting rod assembly 8 is not transmitted on the bushing 9.

During the retraction of the lever 1 in the direction opposite to Arrow Br the lower edge 16 of hole 20 rests exactly on the stationary dog 18 if the clearance between the brake shoe 37 and the brake drum 38 corresponds to the idle stroke determined by the length of hole 20; in that case the movement of the adjusting rod assembly 8 is not transmitted to the bushing 9. If however the clearance between the brake shoe 37 and the brake drum 38 is larger than the predetermined idle stroke corresponding to the length of hole 20, the adjusting rod assembly 8 is pulled down as the lower edge 16 of the hole abuts the stationary dog 18, resulting in a clockwise angular rotation of the bushing 9, during which, initially the sleeve 12, due to its wedging between these two parts, is taken along.

Therefore the threaded interengagement of sleeve 12 with the worm shaft generates a contact force with an axial component which separates the sleeve 12 and the bushing 9, so that the bushing 9 is then freely rotatable relative to sleeve 12, and, of course, the wormshaft 4 is not taken along during clockwise rotation of the bushing 9.

Figures 3, 4:
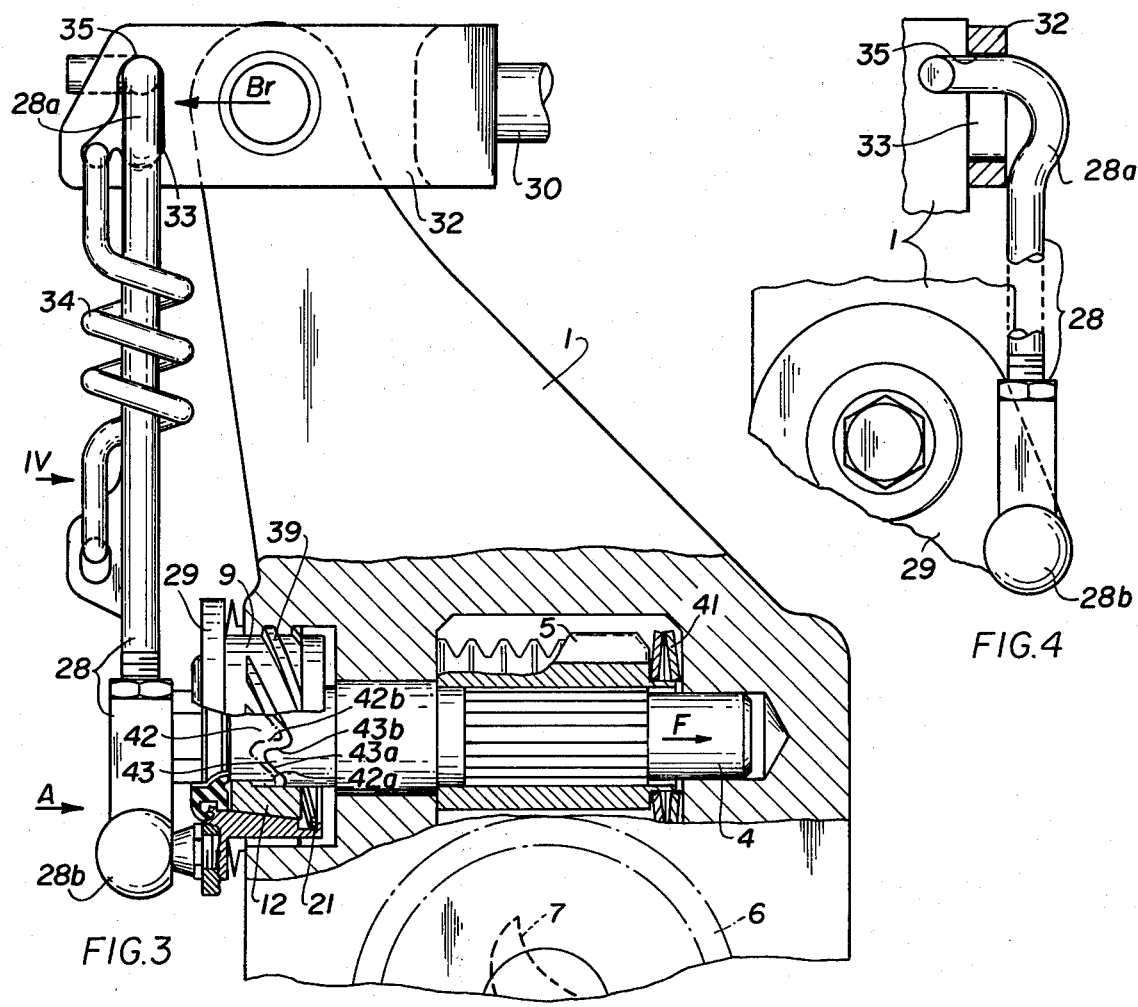
FIG. 3 is a part sectional, part elevational view of an alternative embodiment of this invention.
FIG. 4 is a part sectional, part elevational view of a detail of the apparatus of FIG. 3 looking in the direction of arrow IV.

The illustration in FIG. 3 is of a further type of mechanism pertaining to the invention and represents a further development of the basic type illustrated in FIG. 1, but one in which the bushing 9 has an external thread 39 which is threadable in the housing of the lever 1.

The ramp means between the sleeve 12 and the wormshaft 4 which in FIG. 1 comprises the threaded connection, is replaced by a confronting tooth-like configurations of which each tooth has an oblique flanks forming a segment of a helix of coarse pitch. The wormshaft 4 has teeth 43 with oblique flank 43a and straight flank 43b, and the sleeve 12 has cooperating teeth 42, shown in chain-dot line, with oblique flanks 42a and straight flank 42b. Between the teeth 43 of the wormshaft 4 and the teeth 42 of the sleeve 12 is provided a backlash, or clearance which provides for lost motion in the rotational movement of the sleeve and shaft, that clearance being related to the idle running of the mechanism or the clearance between the shoes and drums of the brake.

An adjusting rod assembly 28 is connected at one end to the flange 29 of the bushing 9 by means of an adjustable swivel joint 28b, and its other, crooked end 28a is disposed in an elongated hole 33 formed in the clevis 32 of the piston rod 30 beyond the pivot point of the lever 1 and the piston rod 30. A tension spring 34 is selected for a maximum adjusting force, to prevent an over adjustment of the brakes. This tension spring 34 extends between the clevis 32 and the adjusting rod assembly 28, holding the crooked end 28a of the assembly in close contact with an upper edge 35 of hole 33.

A further feature of the embodiment of FIG. 3 is that the wormshaft 4 along with the worm 5 is axially movable in the housing against the force of belleville springs 41.

The apparatus of FIG. 3 functions as follows: during brake actuating movement of the piston rod 30 in the direction of the Arrow Br, with a corresponding angular rotation of the lever 1 the bushing 9 rotates in an anticlockwise direction under the influence of assembly 28 and spring 34.

The sleeve 12 also performs this rotational movement, so that after overcoming the backlash or clearance, the oblique flanks 42a of the sleeve 12 butt against the opposite oblique flanks 43a of the wormshaft 4, further rotational movement in the anticlockwise direction bringing about a corresponding rotational movement of the worm 5, and thereby an adjustment of the cam 7 in an anticlockwise direction. The thread hand of the external thread 39 of the bushing 9 and that of the oblique flanks 42a of the bushing flanks, and 43a of the wormshaft 4 are the same, and the external thread 39 has a lesser pitch than that of the oblique flankes 43a, so that a reduction ratio between the rotational movement of the bushing 9 and that of the wormshaft 4 exists. Thus the wormshaft executes lesser rotational movement than the bushing 9; and a corresponding relative movement is imparted between the oblique flank 42a of the sleeve 12 and the corresponding oblique flanks 43a of the wormshaft 4.

In case of distortion of the brake drum 38 due to the application of high braking forces, the adjustment actuating movement of the wormshaft 4 is interrupted and the wormshaft and worm 5 moves axially, depressing the belleville springs 41; thereby this axial movement disengages the flanks 42a and 43a, thus allowing further free rotation of the bushing 9 without further adjustment effect.

In the event that continued rotational movement of the lever 1, accompanied by corresponding further rotation of the bushing 9, occurs, due to high distortion of the brake drum 38, the oblique flanks 42a and 43a may mesh again. In that case a further rotation of the bushing 9 is not possible because of the high internal frictions, and the spring 34 elongates. At which time hole 33 moves upwards relative to the crooked end 28a of the adjusting rod assembly 28.

During the retraction stroke of the piston rod 30 in the opposite direction of the Arrow Br the hole 33 will move downwards till the upper end of the crooked end 28a again abuts the edge 35 of that opening; the spring 34 will regain its initial extension; thereafter the adjusting rod assembly 28 will rotate the bushing 9 together with the sleeve 12 in a clockwise direction, separating again the oblique flanks 42a and 43a. Afterwards the wormshaft 4 along with the worm 5, under the action of the belleville springs 41, slides towards the left (FIG. 3) until the worm 5 returns to its initial position. Simultaneously, through the rotational movement of the bushing 9 and through that of the sleeve 12, the straight flanks 42b of the sleeve 12 come into bearing with the straight flanks 43b of the wormshaft 4, so that, assuming that an adjustment has occurred, the sleeve 12 is turned relative to the bushing 9.

With an appropriate selection of the parameter of the elements of the embodiment of FIG. 3 an alternative mode of operation is available in which an adjustment of the cam 7 can be made during the retraction stroke. In this alternative mode, the operation of the elements during braking is similar to that described above. The main difference consists in that the spring 34 has a smaller tension force, insufficient to cause a cam adjustment, so that during the brake stroke rotation of the bushing 9 together with sleeve 12 occurs only until the oblique flanks 42a and 43a of the teeth 42 and 43 come into contact. In this case a prolonged brake stroke does not bring about a rotation of the bushing 9 but the spring 34 will be extended and the oblong hole 33 will move upwards relative to the crooked end 28a of the adjusting rod assembly 28.

During the retracting stroke of the piston rod 30 in the opposite direction of the Arrow Br, the worm 5 is no longer locked to the wormwheel 6, but the axial compression of the belleville springs 41 comes into effect so that the worm 5 together with the wormshaft 4 moves into the housing of the lever 1 in a direction opposite to Arrow F. This axial force and movement of the wormshaft 4 is translated by means of the oblique flanks 43a of the wormshaft 4, slipping along the corresponding oblique flanks 42a of the sleeve 12, into an angular rotation of worm 5, and the cam 7 is adjusted. This adjustment continues until the retraction movement of the piston rod 30 in the opposite direction of the Arrow Br brings the crooked end 28a to its initial position in contact with the upper edge 35 of the oblong hole. At this time assembly 28 moves relatively downwards, and the bushing 9 is turned in the clockwise direction causing disengagement of the oblique flanks 43a.

Figure 5:
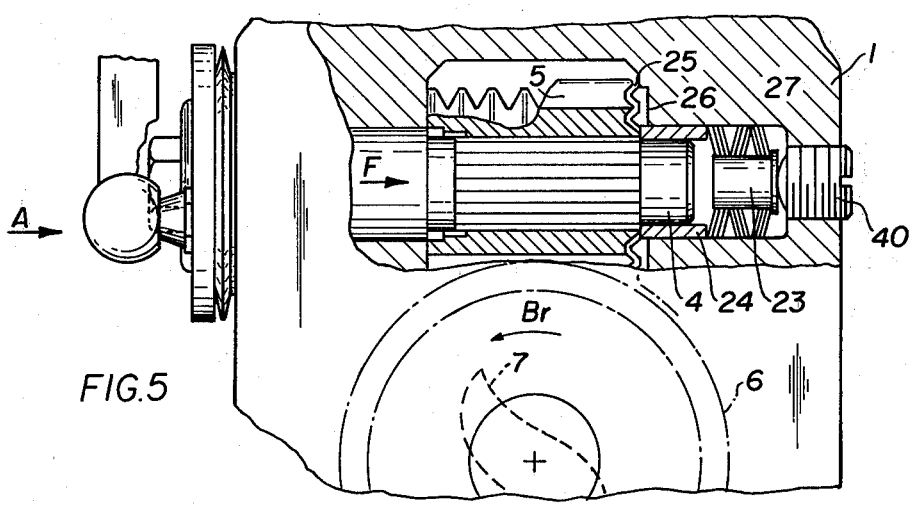
FIG. 5 is a detail of a further embodiment of the invention shown partly in elevation and partly in section.

The modified embodiment illustrated in FIG. 5 differs from that of FIG. 3 in that the worm 5 has at its right hand end annular profiles 25 with conical surfaces and corresponding profiles 26 on the confronting face of the housing. In non-operating positions and during the adjusting operations, the worm 5 is kept in contact with the left wall of the housing of lever 1 by belleville springs 27 through the intermediary of a floating sleeve 24. The profiles 25 and 26 and the belleville springs 27 are so arranged that upon the application of a predetermined brake pressure the worm 5 with its profiles 25 is pressed against the profiles 26, and resists further rotational movement. The compression force of the belleville springs 27 which are centered around a support 23 in the housing can be adjusted by an adjusting screw 40.

Coatings or inserts are not shown in the drawings. However, it will be appreciated that such coatings or inserts of material having a high friction coefficient could contribute to an increase in the resistance to turning of the worm 4 relative to the housing of the lever 1, and that with the use of such coatings or inserts it may be possible to eliminate the profiles 25 and 26.

Advantages of the embodiment of FIG. 5 are that a reduction of the internal friction torque due to the minimal contact surfaces between the support 23 and the adjusting screw 40 during adjustment occurs, and a higher frictional torque between the worm 5 and the housing of the lever 1 exists when the adjustment is interrupted.

It must be recognized that the individual elements of the adjusting mechanism, such as the ramp means of the one-way drive mechanism, or the connection between the bushing and the housing, or the components of the adjusting rod can be interchanged between the several embodiments described herein without deviation from the principles of the invention.

Although the invention has been described with reference to specific example embodiments, it is to be understood that it is intended to cover all modifications and equivalents within the scope of the appended claims.

What I claim is:

1. In an apparatus for adjusting a predetermined clearance between a brake shoe (37) and a corresponding brake drum (38), including a housing rotatable about an axis, actuating lever means (1) forming part of said housing, a worm wheel (6) journalled in said housing, brake adjusting means (7) operatively interposed between said worm wheel (6) and said brake shoe (37), shaft means (4) journalled in said housing and having a free end, worm means (5) supported by said shaft means for meshing engagement with said worm wheel (6), force transmitting means including a force limiting member operatively arranged to respond to a movement of said lever means rotating said housing about said axis (2) for rotating said worm means, the improvement wherein said force transmitting means comprise a one-way clutch mechanism and linkage means (8, 15, etc.) operatively arranged to transmit a rotational movement of said actuating lever means and thus of said housing through said clutch mechanism to rotate said worm means (5), said one-way clutch mechanism comprising first bushing means (9) operatively connected to said linkage means and rotatably supported in said housing around said free end of said shaft means, second bushing means (12) operatively located within said first bushing means, said first and second bushing means having respective inner and outer cooperating conical surface means, said second bushing means (12) and said free end of said shaft means comprising cooperating helical threaded means adapted to mesh for transmitting torque to said shaft means, whereby said worm means may be rotated in a stepless manner in the direction of adjustment.

2. The apparatus of claim 1, wherein said helical threading means comprise helical flanks and helical grooves continuously meshing with said helical flanks.

3. The apparatus of claim 1, further comprising lost motion means operatively interposed in said force transmitting means.

4. The apparatus of claim 3, wherein said lost motion means comprise an elongated hole (20) as part of said linkage means.

5. The apparatus of claim 3, wherein said lost motion means comprise a backlash or free play in said helical threading means.

6. The apparatus of claim 1, wherein said linkage means comprise telescoping means (8, 8a) and spring means (15) biasing said telescoping means 7. The apparatus of claim 1, wherein said linkage means are operatively connected to a fixed point.

8. The apparatus of claim 1, further comprising spring means (21) operatively interposed between said housing and said second bushing means (12).

9. The apparatus of claim 1, further comprising adjustment means (10) in said housing for manually adjusting the position of said shaft means in said housing.

10. In an apparatus for adjusting a predetermined clearance between a brake shoe (37) and corresponding brake drum (38), including a housing rotatable about an axis, actuating lever means (1) forming part of said housing, a worm wheel (6) journalled in said housing, brake adjusting means (7) operatively interposed between said worm wheel (6) and said brake shoe (37), shaft means (4) journalled in said housing and having a free end, worm means (5) supported by said shaft means for meshing engagement with said worm wheel (6), force transmitting means including a force limiting member operatively arranged to respond to a movement of said lever means rotating said housing about said axis (2) for rotating said worm means, the improvement wherein said force transmitting means comprise a one-way clutch mechanism and linkage means (28, 34) operatively arranged to transmit a rotational movement of said actuating lever means and thus of said housing, through said clutch mechanism to rotate said worm means, said one-way clutch mechanism comprising first bushing means (9) operatively connected to said linkage means and rotatably supported in said housing around said free end of said shaft means, second bushing means (12) operatively located within said first bushing means, said first and second bushing means having respective inner and outer cooperating conical surface means, said second bushing means (12) and said free end of said shaft means comprising cooperating teeth with substantially helical flanks (42a, 42b; 43a, 43b) adapted to mesh for transmitting torque to said shaft means whereby said worm means may be rotated in a stepless manner in the direction of adjustment.

11. The apparatus of claim 10, further comprising lost motion means operatively interposed in said force transmitting means.

12. The apparatus of claim 10, wherein said lost motion means comprise an elongated hole (33) as part of said linkage means.

13. The apparatus of claim 10, wherein said lost motion means comprise a backlash or free play between said substantially helical flanks (42a, 42b; 43a, 43b) of said cooperating teeth.

14. The apparatus of claim 10, wherein said linkage means comprise spring means (34) operatively arranged to bias the linkage means into a predetermined position.

15. The apparatus of claim 10, further comprising brake actuating means and wherein said linkage means are operatively connected to said brake actuating means and to said first bushing means.

16. The apparatus of claim 10, further comprising spring means (21) operatively interposed between said housing and said second bushing means (12).

17. The apparatus of claim 10, further comprising biasing spring means (41) operatively interposed between said housing and said shaft means (4) for biasing said shaft means (4) in an axial direction.

18. The apparatus of claim 10, wherein said housing means comprise a recess receiving said first bushing means (9), said recess having inner threading means, said first bushing means (9) having outer threading means cooperating with said inner threading means for the axial displacement of said first bushing means in response to the rotation of said first bushing means by said linkage means.

* * * * *